(12) United States Patent
Diwakar

(10) Patent No.: US 9,591,060 B1
(45) Date of Patent: Mar. 7, 2017

(54) TRANSFERRING APPLICATIONS BETWEEN COMPUTER SYSTEMS

(71) Applicant: Kiran Prakash Diwakar, Maharashtra (IN)

(72) Inventor: Kiran Prakash Diwakar, Maharashtra (IN)

(73) Assignee: CA, Inc., New York, NY (US)

( * ) Notice: Subject to any disclaimer, the term of this patent is extended or adjusted under 35 U.S.C. 154(b) by 875 days.

(21) Appl. No.: 13/909,800

(22) Filed: Jun. 4, 2013

(51) Int. Cl.
*G06F 15/16* (2006.01)
*H04L 29/08* (2006.01)

(52) U.S. Cl.
CPC ................................. *H04L 67/10* (2013.01)

(58) Field of Classification Search
USPC .................... 709/201, 206; 718/104; 705/37
See application file for complete search history.

(56) References Cited

U.S. PATENT DOCUMENTS

| | | | | |
|---|---|---|---|---|
| 2009/0089380 A1* | 4/2009 | Wang | ................ | G06F 17/30864 709/206 |
| 2009/0300635 A1* | 12/2009 | Ferris | .................... | G06F 9/5072 718/104 |
| 2010/0058349 A1* | 3/2010 | Diwakar | ............... | G06F 9/5044 718/104 |
| 2010/0087963 A1* | 4/2010 | Boston | ................... | G06Q 50/06 700/295 |
| 2010/0125473 A1 | 5/2010 | Tung et al. | | |
| 2010/0125664 A1* | 5/2010 | Hadar | ................... | G06F 9/5072 709/224 |
| 2010/0235887 A1* | 9/2010 | Burch | ..................... | H04L 63/20 726/4 |
| 2010/0268632 A1* | 10/2010 | Rosenthal | ............. | G06Q 40/08 705/37 |
| 2010/0271956 A1* | 10/2010 | Diwakar | ................... | H04J 3/22 370/242 |
| 2010/0274621 A1 | 10/2010 | Diwakar et al. | | |
| 2010/0287263 A1* | 11/2010 | Liu | ....................... | G06F 9/5088 709/221 |
| 2010/0293110 A1 | 11/2010 | Rosenthal et al. | | |
| 2010/0318642 A1* | 12/2010 | Dozier | ................... | H04L 12/66 709/223 |
| 2010/0319004 A1* | 12/2010 | Hudson | ................ | G06F 9/5072 719/313 |
| 2010/0332401 A1 | 12/2010 | Prahlad et al. | | |
| 2010/0332629 A1 | 12/2010 | Cotugno et al. | | |

(Continued)

*Primary Examiner* — Tammy Nguyen
(74) *Attorney, Agent, or Firm* — Baker Botts L.L.P.

(57) ABSTRACT

According to one aspect of the present disclosure, a processor accesses target information associated with a target computer system, the target computer system being a candidate computer system for transferring execution of an application. The processor accesses first information associated with a first computer system, the first computer system storing a first state of the application. The processor also accesses second information associated with a second computer system, the second computer system storing a second state of the application. The processor selects a transfer computer system from which to transfer the state of the application to facilitate transfer of execution of the application, the transfer computer system selected from the first computer system and the second computer system based at least on the first information, the second information, and the target information.

17 Claims, 3 Drawing Sheets

(56) References Cited

U.S. PATENT DOCUMENTS

| | | |
|---|---|---|
| 2010/0332818 A1 | 12/2010 | Prahlad et al. |
| 2010/0333116 A1 | 12/2010 | Prahlad et al. |
| 2011/0016214 A1 | 1/2011 | Jackson |
| 2011/0022642 A1 | 1/2011 | deMilo et al. |
| 2011/0055559 A1 | 3/2011 | Li et al. |
| 2011/0072486 A1 | 3/2011 | Hadar et al. |
| 2011/0072487 A1 | 3/2011 | Hadar et al. |
| 2011/0106927 A1 | 5/2011 | Carter et al. |
| 2011/0107398 A1 | 5/2011 | Earl et al. |
| 2011/0118880 A1 | 5/2011 | Diwakar et al. |
| 2011/0131275 A1 | 6/2011 | Maida-Smith et al. |
| 2013/0132457 A1 | 5/2013 | Diwakar |

\* cited by examiner

TRANSFERRING APPLICATIONS BETWEEN COMPUTER SYSTEMS

BACKGROUND

The present disclosure relates generally to computer applications and more particularly to transferring applications between computer systems. Computer applications are frequently executed by one or more systems having access to the Internet or another suitable network. In addition to an active state stored by a computer system executing the application, a backup state may be stored by one or more other computer systems. Applications may be executed by a user of the application or, in some cases, one or more computer systems operated by a third party, such as a cloud-computing vendor or a service provide, for example. Execution of applications may be transferred from one computer system to another computer system. In such cases, information associated with the application may be communicated over a network from the computer system initially executing the application to the computer system that will execute the application following the transfer. Computers involved in application transfers may be located in the same or in different geographic locations.

BRIEF SUMMARY

According to one aspect of the present disclosure, a processor accesses target information associated with a target computer system, the target computer system being a candidate computer system for transferring execution of an application. The processor accesses first information associated with a first computer system, the first computer system storing a first state of the application. The processor also accesses second information associated with a second computer system, the second computer system storing a second state of the application. The processor selects a transfer computer system from which to transfer the state of the application to facilitate transfer of execution of the application, the transfer computer system selected from the first computer system and the second computer system based at least on the first information, the second information, and the target information.

BRIEF DESCRIPTION OF THE DRAWINGS

For a more complete understanding of the present disclosure, and for further features and advantages thereof, reference is now made to the following description, taken in conjunction with the accompanying drawings, in which.

DETAILED DESCRIPTION

Figure 1:
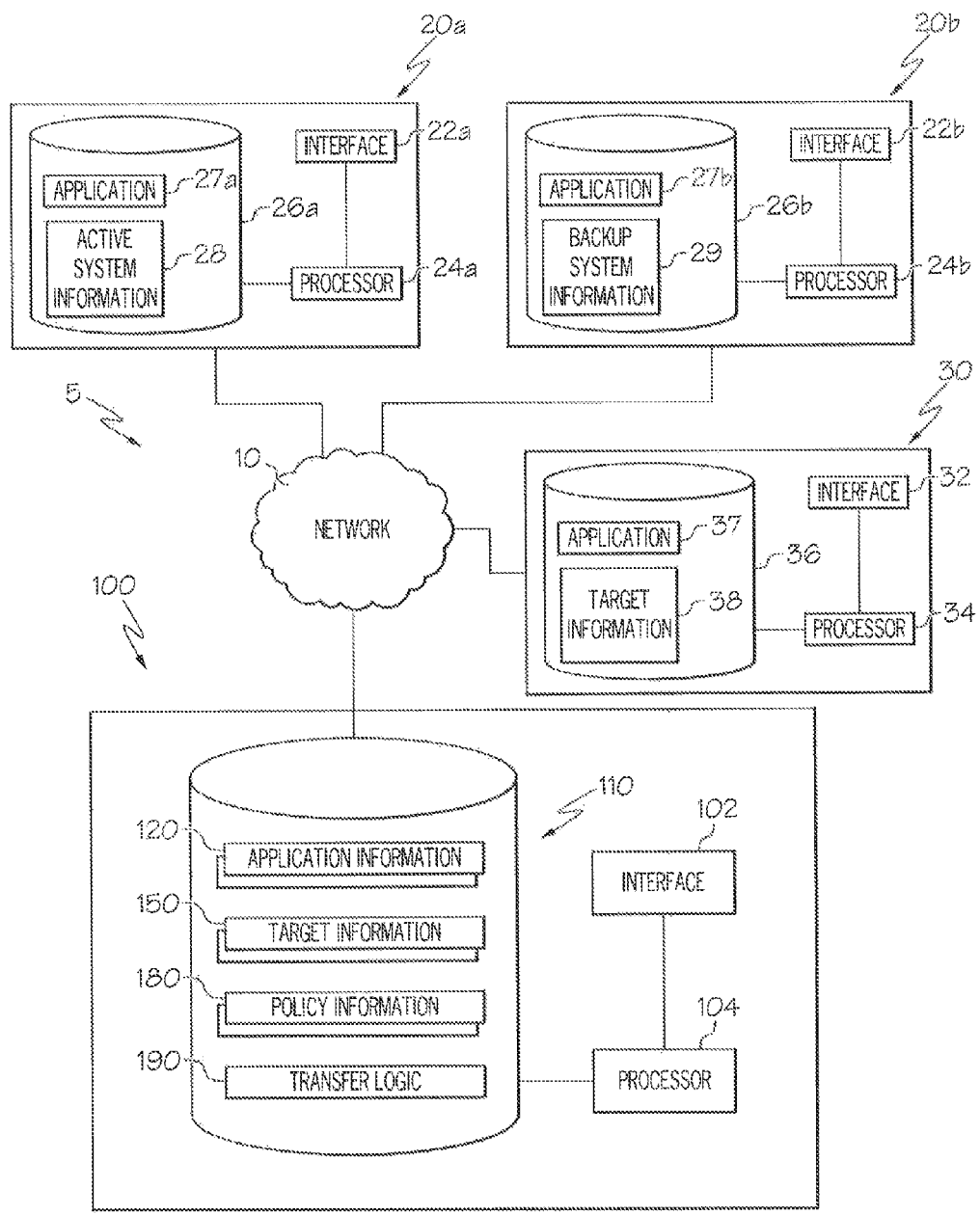
FIG. 1 illustrates an example system that is operable to facilitate transferring execution of an application, according to certain embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, an example system 5 facilitates transferring execution of an application. System 5 includes transfer module 100, which communicates with computer systems 20 and one or more computer systems 30 over network 10. Computer systems 20 include an active computer system 20a and one or more backup computer systems 20b.

Transfer module 100 facilitates the transfer of applications. An application may be associated with multiple computer systems, such as computer system 20. Some computer systems, such as computer system 20a, may actively execute the application and store an active state of the application. Other computer systems, such as computer system 20b, may operate as backup systems and store a backup state. Active systems may update backup systems iteratively so that the "delta" between the backup system's state and the active system's state is reduced. A user may choose to transfer execution of the application to a target computer system. However, transferring the full application state from an active computer system may not be the most efficient way to transfer the application. Based on information associated with computer systems 20 and the target computer system, transfer module 100 selects a transfer computer system from which to transfer application state. When the selected transfer computer system is a backup system, the backup may not contain certain up-to-date information stored by one or more active systems. In such cases, the application state stored by the backup computer system may be transferred to the target computer system, and the remaining application state may be transferred by one or more active computer systems.

As used herein, transferring may refer to moving, copying, or any suitable combination thereof. Furthermore, as used herein, transferring an application may refer to transferring state associated with an application, transferring code for running the application, transferring any other stored values associated with the application, or any suitable combination thereof. Transferring an application includes "handing off" an application and "handing off" execution of application. Following transfer of the application, any of the transferring computer systems may or may not maintain application state, application code, or other stored values. Following transfer of the application, any of the transferring computer systems that were previously executing the application may or may not continue executing the application. Following transfer of the application, the target computer system may or may not begin execution of the application.

Network 10 represents any suitable network operable to facilitate communication between the components of system 5. Network 10 may include any interconnecting system capable of transmitting audio, video, signals, data, messages, or any combination of the preceding. Network 10 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

In the illustrated embodiment, computer systems 20 include computer system 20a and computer system 20b. However, in other embodiments, computer systems 20 may include any number of other computer systems. These computer systems may operate as active computer systems, backup computer systems, or as any other type of computer system. Backup computer systems may include failover computer systems that are operable to take over execution of the application from one or more active computer systems and may store or otherwise have access to application state. Backup computer systems may also include computer systems that store or otherwise have access to application state but are not operable to execute the application. Furthermore, transfer of the application may involve any combination of computer systems 20.

Computer system 20a may include one or more servers, laptops, personal computers, monitors, display devices, handheld devices, tablet computers, smartphones, smart chip cards, user input devices, virtual machines, or any other suitable component for executing a computer application. Computer system 20a may include devices owned, operated, managed, and/or housed partially or wholly by an entity that is not a primary user of the application, such as a cloud-computer vendor. Computer system 20a may also include devices owned, operated, managed, and/or housed partially or wholly by a user of the application. In certain embodiments, system 5 may include multiple computer systems 20a, and each computer system 20a may store the same or different information associated with the application. Such computer systems may execute the application independently, such that the execution of the application on one computer system 20a does not affect the execution of the application on another computer system 20a, or they may execute the application in an interdependent manner. Furthermore, multiple types of computer systems 20a can operate together to perform the functions described herein.

Computer system 20a is operable to execute a computer application. For example, computer system 20a may be a server running a web-based application, maintain an active state associated with the application. Computer system 20a may also be operable to transfer execution of the application to another computer system. For various reasons, a decision may be made to transfer execution of the application to a target computer system, such as computer system 30. In such cases, computer system 20a may be operable to communicate one or more portions of the active state to the target computer system. Computer system 20a may therefore facilitate the processing provided by the application while enabling efficient transfer of that application to another computer system when requested. Computer system 20a may or may not be actively executing the application at any particular time.

In the illustrated embodiment, computer system 20a includes network interface 22a, processor 24a, and memory 26a.

Network interface 22a represents any suitable device operable to receive information from network 10, transmit information through network 10, perform suitable processing of the information, communicate to other devices, or any combination thereof. For example, network interface 22a may receive information from computer system 20a, computer system 30, and/or transfer module 100. Network interface 22a is also configured to communicate information to these computer systems. Network interface 22a represents any port or connection, real or virtual, including any suitable element, including protocol conversion and data processing capabilities, to communicate through a LAN, WAN, or other communication system that allows computer system 20a to communicate with network 10 and/or any other computer system connected directly or indirectly to network 10.

Processor 24a communicatively couples to network interface 22a and memory 26a, and controls the operation and administration of computer system 20a by processing information received from network interface 22a and memory 26a. Processor 24a includes any element that operates to control and process information. For example, processor 24a may execute code associated with application 27a to facilitating execution of the application and/or transfer of the application. Processor 24a may be a programmable logic device, a microcontroller, a microprocessor, any suitable processing device, or any suitable combination of the preceding.

Memory 26a stores, either permanently or temporarily, data, operational software, or other information for processor 24a, other components of computer system 20a, or other components of system 5. Memory 26a includes any one or a combination of volatile or nonvolatile local or remote devices suitable for storing information. For example, memory 26a may include random access memory (RAM), read only memory (ROM), flash memory, magnetic storage devices, optical storage devices, network storage devices, cloud storage devices, solid state devices, or any other suitable information storage device or a combination of these devices. While illustrated as including particular modules, memory 26a may include any suitable information for use in the operation of computer system 20a. Information described as being stored by memory 26a may be distributed and/or duplicated across multiple memory devices in computer system 20a or in other devices.

In the illustrated embodiment, memory 26a includes application 27a and active system information 28.

Application 27a includes computer code, configuration information, application state, or any other suitable information associated with an application. Application 27a may include source code, compiled code, libraries, text files, stored values, or any other information associated with the application. Portions of application 27a may be stored as part of a database, file system, or any other storage system. Portions of application 27a may also be encrypted. Application 27a may include computer code associated with the processor of determining a delta state of the application, as described below in reference to transfer logic 190. For example, computer system 20a may determine which portions of the application state have been added, deleted, or updated since the most recent backup by computer system 20b. One or more portions of application 27a may or may not be removed following the transfer of the application.

Active system information 28 includes information associated with computer system 20a. This information may include computer system identifiers, server names, location information (such as, for example, address information, geo-tag information, or any other information associated with a location), resource utilization information, resource availability information, network information (such as, for example, IP addresses, bandwidth information), hardware information (such as processor or memory information), software information, operating system information, security information (such as encoding information, encryption information, or authorization information), vendor information, information indicating whether this computer system is an active or backup system, a baseline snapshot of the operating system, a baseline snapshot of one or more applications, policy information, history information (such as, for example, a history of hypervisor vendors, a history of cloud vendors, or any other history information), or any other information associated with computer system 20a. Active system information 28 may also include information associated with one or more applications running and/or stored on the computer system. For example, active system information 28 may include information indicating when the application was most recently backed up or information identifying one or more portions of the application state that have changed since the most recent back-up.

Active system information 28 may also include information indicating relationships between computer systems, relationships between applications, or relationships between computer systems and applications. For example, such relationships may include relationships between multiple computer systems running the application concurrently, relationships between backup systems and active systems, relationships between applications on a single computer system, relationships between applications on separate computer systems, or any other suitable relationship. As a particular example, this information may indicate a system running a WINDOWS operating system, running an APACHE TOMCAT web server application on the WINDOWS operating system, and running another application hosted by APACHE TOMCAT. In some embodiments, active system information may also include one or more portions of the application state itself. One or more portions of active system information 28 may be communicated to transfer module 100 at certain times.

Computer system 20b may include one or more servers, laptops, personal computers, monitors, display devices, handheld devices, tablet computers, smartphones, smart chip cards, user input devices, virtual machines, or any other suitable component for executing a computer application. Computer system 20b may include devices owned, operated, managed, and/or housed partially or wholly by an entity that is not a primary user of the application, such as a cloud-computer vendor. Computer system 20b may also include devices owned, operated, managed, and/or housed partially or wholly by a user of the application. In certain embodiments, system 5 may include multiple computer systems 20b, and each computer system 20b may store the same or different backup information associated with the application. Furthermore, multiple types of computer systems 20b can operate together to perform the functions described herein.

Computer system 20b is operable to store information associated with the application and communicate one or more portions of this information to another computer system over network 10. Computer system 20b may also be operable to execute the application. For example, computer system 20b may operate as a failover server for computer system 20a, storing backup information that may be periodically updated to reflect the active state of the application executing on computer system 20a. In such embodiments, computer system 20b may take over execution of the application. For various reasons, a decision may be made to transfer execution of the application to a target computer system, such as computer system 30. In such cases, transfer module 100 may select computer system 20b as a first transfer computer system, and computer system 20b may communicate one or more portions of the backup information to the target computer system. Computer system 20b may therefore operate as a backup system for the application while also enabling efficient transfer of that application to another computer system when requested.

In the illustrated embodiment, computer system 20b includes network interface 22b, processor 24b, and memory 26b.

Network interface 22b represents any suitable device operable to receive information from network 10, transmit information through network 10, perform suitable processing of the information, communicate to other devices, or any combination thereof. For example, network interface 22b may receive information from computer system 20a, computer system 30, and/or transfer module 100. Network interface 22b is also configured to communicate information to these computer systems. Network interface 22b represents any port or connection, real or virtual, including any suitable element, including protocol conversion and data processing capabilities, to communicate through a LAN, WAN, or other communication system that allows computer system 20b to communicate with network 10 and/or any other computer system connected directly or indirectly to network 10.

Processor 24b communicatively couples to network interface 22b and memory 26b, and controls the operation and administration of computer system 20b by processing information received from network interface 22b and memory 26b. Processor 24b includes any element that operates to control and process information. For example, processor 24b may execute code associated with application 27b to facilitating execution of the application and/or transfer of the application. Processor 24b may be a programmable logic device, a microcontroller, a microprocessor, any suitable processing device, or any suitable combination of the preceding.

Memory 26b stores, either permanently or temporarily, data, operational software, or other information for processor 24b, other components of computer system 20b, or other components of system 5. Memory 26b includes any one or a combination of volatile or nonvolatile local or remote devices suitable for storing information. For example, memory 26b may include random access memory (RAM), read only memory (ROM), flash memory, magnetic storage devices, optical storage devices, network storage devices, cloud storage devices, solid state devices, or any other suitable information storage device or a combination of these devices. While illustrated as including particular modules, memory 26b may include any suitable information for use in the operation of computer system 20b. Information described as being stored by memory 26b may be distributed and/or duplicated across multiple memory devices in computer system 20b or in other devices.

In the illustrated embodiment, memory 26b includes application 27b and backup system information 29.

Application 27b includes computer code, configuration information, application state, or any other suitable information associated with an application. Application 27b may include source code, compiled code, libraries, text files, stored values, or any other information associated with the application. Portions of application 27b may be stored as part of a database, file system, or any other storage system. Portions of application 27b may also be encrypted. Application 27b may include computer code associated with the processor of determining a delta state of the application, as described below in reference to transfer logic 190. For example, computer system 20b may determine which portions of the application state have been added, deleted, or updated since the most recent backup by computer system 20b. One or more portions of application 27a may or may not be removed following the transfer of the application. One or more portions of application 27b may be different from application 27a. As one example, application 27b may include computer code enabling computer system 20b to operate as a backup system for computer system 20a. As another example, application 27a may include different application state from the application state included in application 27b.

Backup system information 29 includes information associated with computer system 20b. This information may include any information or types of information described above in reference to active system information 28.

Computer system 30 may include one or more servers, laptops, personal computers, monitors, display devices, handheld devices, tablet computers, smartphones, smart chip cards, user input devices, virtual machines, or any other suitable component for receiving information over network 10 and executing a computer application. Computer system 30 may include devices owned, operated, managed, and/or housed partially or wholly by an entity that is not a primary user of the application, such as a cloud-computer vendor. Computer system 30 may also include devices owned, operated, managed, and/or housed partially or wholly by a user of the application. In certain embodiments, system 5 may include multiple computer systems 30, and one computer system 30 may operate independently from interdependently with one or more other computer systems 30.

Computer system 30 is operable to receive information associated with a computer application and execute such applications. For example, an application executing on a primary server and having another backup server may be transferred to computer system 30. To facilitate this transfer, computer system 30 may receive information associated with the application from both an active computer system and/or a backup computer system. Following such transfers, the state of the application stored on computer system 30 may be the same as or substantially similar to the state stored on the active computer system prior to the transfer.

In the illustrated embodiment, computer system 30 includes network interface 32, processor 34, and memory 36.

Network interface 32 represents any suitable device operable to receive information from network 10, transmit information through network 10, perform suitable processing of the information, communicate to other devices, or any combination thereof. For example, network interface 32 may receive information from computer system 20a, computer system 20b, and/or transfer module 100. Network interface 32 is also configured to communicate information to these computer systems. Network interface 32 represents any port or connection, real or virtual, including any suitable element, including protocol conversion and data processing capabilities, to communicate through a LAN, WAN, or other communication system that allows computer system 30 to communicate with network 10 and/or any other computer system connected directly or indirectly to network 10.

Processor 34 communicatively couples to network interface 32 and memory 26b, and controls the operation and administration of computer system 30 by processing information received from network interface 32 and memory 36. Processor 34 includes any element that operates to control and process information. For example, processor 34 may execute code associated with application 37 to facilitating execution of the application and/or transfer of the application. Processor 34 may be a programmable logic device, a microcontroller, a microprocessor, any suitable processing device, or any suitable combination of the preceding.

Memory 36 stores, either permanently or temporarily, data, operational software, or other information for processor 34, other components of computer system 30, or other components of system 5. Memory 36 includes any one or a combination of volatile or nonvolatile local or remote devices suitable for storing information. For example, memory 36 may include random access memory (RAM), read only memory (ROM), flash memory, magnetic storage devices, optical storage devices, network storage devices, cloud storage devices, solid state devices, or any other suitable information storage device or a combination of these devices. While illustrated as including particular modules, memory 36 may include any suitable information for use in the operation of computer system 30. Information described as being stored by memory 36 may be distributed and/or duplicated across multiple memory devices in computer system 30 or in other devices.

In the illustrated embodiment, memory 36 includes application 37 and target information 38.

Application 37 includes computer code, configuration information, application state, or any other suitable information associated with an application. Application 37 may include any of the information described above in reference to applications 27a and/or 27b. In some embodiments, portions of application 37 may be present on computer system 30 prior to the transfer of application state described herein. For example, computer system 30 may contain computer code operable to execute the application, and computer system 30 may only receive application state from computer systems 20. In other embodiments, this computer code may not be present on computer system 30 prior to the transfer, and computer system 30 may receive the computer code as part of the transfer process.

Target information 38 includes information associated with computer system 30. This information may include any information or types of information described above in reference to active system information 28.

Transfer module 100 represents any suitable components that facilitate transferring execution of an application between computer systems. Transfer module 100 may include a network server, remote server, mainframe, host computer, workstation, web server, personal computer, file server, virtual machine, or any other suitable device operable to process data and communicate with other computer systems over network 10. In some embodiments, transfer module 100 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. The functions of transfer module 100 may be performed by any suitable combination of one or more servers or other components at one or more locations. In the embodiment where the modules are servers, the servers may be public or private servers, and each server may be a virtual or physical server. The server may include one or more servers at the same or at remote locations. Transfer module 100 may also include any suitable component that functions as a server. In some embodiments, computer systems 20a, 20b, and/or 30 may be integrated with transfer module 100, or they may operate as part of the same device or devices.

In the illustrated embodiment, transfer module 100 includes network interface 102, processor 104, and memory 110.

Network interface 102 represents any suitable device operable to receive information from network 10, transmit information through network 10, perform suitable processing of the information, communicate to other devices, or any combination thereof. For example, network interface 102 may receive information from computer systems 20a, 20b, and/or 30. Network interface 102 is also configured to communicate information to computer systems 20a, 20b, and/or 30. Network interface 102 represents any port or connection, real or virtual, including any suitable element, including protocol conversion and data processing capabilities, to communicate through a LAN, WAN, or other communication system that allows transfer module 100 to exchange information with network 10, computer system 20a, computer system 20b, computer system 30, other transfer modules 100, or other components of system 5.

Processor 104 communicatively couples to network interface 102 and memory 110, and controls the operation and administration of transfer module 100 by processing information received from network interface 102 and memory 110. Processor 104 includes any element that operates to control and process information. For example, processor 104 executes transfer logic 190 to facilitating transferring execution of an application between computer systems. Processor 104 may be a programmable logic device, a microcontroller, a microprocessor, any suitable processing device, or any suitable combination of the preceding.

Memory 110 stores, either permanently or temporarily, data, operational software, or other information for processor 104, other components of transfer module 100, or other components of system 5. Memory 110 includes any one or a combination of volatile or nonvolatile local or remote devices suitable for storing information. For example, memory 110 may include random access memory (RAM), read only memory (ROM), flash memory, magnetic storage devices, optical storage devices, network storage devices, cloud storage devices, solid state devices, or any other suitable information storage device or a combination of these devices. While illustrated as including particular modules, memory 110 may include any suitable information for use in the operation of transfer module 100. Information described herein as part of memory 110 may be distributed and/or duplicated across multiple memory devices in transfer module 100 or in other devices.

Application information 120 represents any suitable information associated with a computer application. Transfer module 100 may select a transfer computer system or otherwise manage application transfers based on one or more portions of application information 120. Application information 120 may include information associated with a computer system actively executing an application, information associated with a computer system facilitating backup functionality for the application, and various other types of information related to the application. For example, application information may include location information for computer systems 20a, 20b, and 30; information indicating a data transfer rate between two or more components of system 5; information indicating the availability of one or more computing resources of computer systems 20a, 20b, and 30; information indicating one or more requirements for computer systems to be allowed to execute the application; or any other suitable information.

In certain embodiments, application 120 may include, but is not limited to, vendor information (such as, for example, hardware information, hypervisor information, or other information associated with a vendor), encoding information, server names, IP address, geographical location (such as, for example, geo-tags), operating system information, information associated with applications, information indicated the type or role of a computer system (such as, for example, whether the system is an active server, backup server, failover server, or another type of computer system), a baseline of an application, time information (such as, for example, a time that the application was last backed up), or any suitable combination thereof. Application information 120 may be stored as part of a relational database, tree structure, XML, file system, or any other suitable data structure. Application information 120 is discussed in more detail below in reference to FIG. 2.

Target information 150 represents any suitable information associated with a computer system to which transferring execution of an application is being considered. Target information 150 may include information associated with one or more computer systems that have been or will be considered to receive a transfer of the execution of an application. This may include information such as configuration information, location information, transaction history information, or any other suitable information associated with a target computer system. Target information 150 may include any type of information described above in reference to application information 120. Transfer module 100 may select a first transfer computer system or otherwise manage application transfers based on one or more portions of target information 150. For example, information about the location of computer system 30 may enable transfer module 100 to select a computer system 20 that can communicate application state to the target computer system at the fastest rate. Target information 150 may be stored in a relational database, tree structure, XML, file system, or any other suitable data structure. Target information 150 is discussed in more detail below in reference to FIG. 3.

Policy information 180 represents any suitable information associated with one or more policies associated with an application. A policy includes one or more requirements or preferences associated with an application. Requirements may include any hardware, software, security, location, or any other factor that a computer system must comply with in order to run the application. For example, a policy for an application could indicate processor, RAM, and/or operating system requirements. As another example, a policy could indicate that certain security requirements (such as, for example, encryption requirements, physical security requirements, or certification requirements) must be satisfied for a computer system to be allowed to run the application.

Policies may include any type of requirement and any combination of requirements. These factors may also be considered as preferences rather than requirements. For example, a policy may indicate that a certain factor is preferred, but not necessarily required. Furthermore, policies may include any combination of requirements and preferences, and these requirements and preferences may be analyzed and enforced in a variety of ways. Analysis of a target computer system's compliance with a policy may be evaluated at any time and may be based on information derived from a variety of sources. For example, transfer module 100 may analyze one or more portions of target information 150 to evaluate the target computer system's compliance with a policy. Policy information 180 may be stored in a relational database, tree structure, XML, file system, or any other suitable data structure.

Transfer logic 190 represents any suitable set of instructions, logic, or code embodied in a computer-readable storage medium and operable to facilitate the transferring the execution of an application between computer systems. Transfer logic 190 may be stored in memory 110 or another memory associated with transfer module 100. Transfer logic 190, or portions thereof, may also be embodied in hardware associated with transfer module 100 or other components of system 5. Furthermore, the components of transfer logic 190 may be stored in the same or different memories of the same or different transfer modules 100. Various components of transfer logic 190 may also be stored in different components of system 5.

In operation, transfer logic 190 evaluates information associated with one or more computer systems to facilitate the transfer of an application to a target computer system. An application executing on computer system 20a has an active state stored by computer system 20a and a backup state stored on computer 20b. Transfer logic 190 accesses information about the target computer (computer system 30 in the illustrated embodiment) and information associated with the active and backup computer systems (computer systems 20a and 20b in the illustrated embodiment). Based on this information, transfer logic 190 selects either the active or the backup computer system as a transfer computer system from which to transfer the respective application state. For example, transfer logic 190 may analyze information indicating the respective locations of the computer systems to select the computer system 20 that is geographically closest to computer system 30. Additionally or alternatively, transfer logic 190 may utilize information associated with the computer systems (such as, for example, IP addresses), to determine respective data transfer rates between computer systems 20 and computer system 30. This information may include traceroute information, bandwidth information, ping information, or any other suitable information. By analyzing information associated with these computer systems, transfer logic 190 may determine which computer system 20 is likely to be able to transfer information to computer system 30 the fastest, cheapest, and/or most efficiently. In some embodiments, transfer logic 190 may consider factors in place of or in addition to the location information and data transfer rate information described above. For example, transfer logic 190 could consider data transfer costs, computer resource availability, or any other suitable information that might facilitate improved transfers.

In some embodiments, transfer logic 190 may also perform a preliminary analysis of multiple target computer systems to select a computer system 30 to receive the transfer. For example, transfer logic 190 may evaluate information associated with these computer systems to select a target computer system that best satisfies one or more policies associated with the application. In other embodiments, transfer logic 190 may perform a threshold analysis to determine whether computer system 30 meets one or more minimum requirements. For example, transfer logic 190 may determine that computer system 30 satisfies one or more policies associated with the application.

Transfer logic 190 may also facilitate the transfer of application state from computer systems 20 to computer system 30. For example, if transfer logic 190 determines that computer system 20b is closer than computer 20a to computer system 30, transfer logic 190 may initiate transfer of the application stored by computer system 20b and the transfer of a "delta" state stored by computer system 20a. This delta state is information associated with a difference between the application state stored by computer systems 20a and 20b. For example, computer system 20b may be a failover system for the active computer system 20a that has a baseline periodically updated with information from the active system. Upon determining that information can be transferred to the target computer system more efficiently from computer system 20b, transfer logic 190 may initiate determination of the delta state (i.e., the application state stored by computer system 20a that is different from the application state stored by computer system 20b). The baseline state can then be transferred to computer system 30 from computer system 20b, and the delta state can be transferred to computer system 30 from computer system 20a. In some embodiments, transfer module 100 may itself determine the delta state, while in other embodiments, one or more computer systems 20 may determine the delta state.

In an exemplary embodiment of operation, transfer module 100 accesses target information associated with a target computer system, the target computer system being a candidate computer system for transferring execution of an application. Transfer module 100 accesses first information associated with a first computer system, the first computer system storing a first state of the application. Transfer module 100 also accesses second information associated with a second computer system, the second computer system storing a second state of the application. Transfer module 100 then selects a transfer computer system from which to transfer the state of the application, the transfer computer system selected from the first computer system and the second computer system based at least the on the first information, the second information, and the target information. Execution of the application may then be transferred to the target computer system. If the first transfer computer system is the second computer system, transfer module 100 may initiate determination of a delta state including a portion of the first state that is different from the second state. Transfer logic 190 may then initiate transfer of the second state to the target computer system and initiate transfer of the delta state from the first computer system.

A component of system 5 may include an interface, logic, memory, and/or other suitable element. An interface receives input, sends output, processes the input and/or output, and/or performs other suitable operations. An interface may be implemented with any suitable combination of hardware, firmware, and software. Logic performs the operation of the component. For example, logic executes instructions to generate output from input. Logic may be implemented with any suitable combination of hardware, firmware, and software. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 5 without departing from the scope of the disclosure. For example, system 5 may implement application transfer procedures different from or in addition to those described herein. As another example, multiple transfer modules 100 may operate in parallel to facilitate application transfers. System 5 may include any number of networks 10, computer systems 20a, computer systems 20b, computer systems 30, and transfer modules 100. Any suitable logic may perform the functions of system 5 and the components within system 5.

Figure 2:
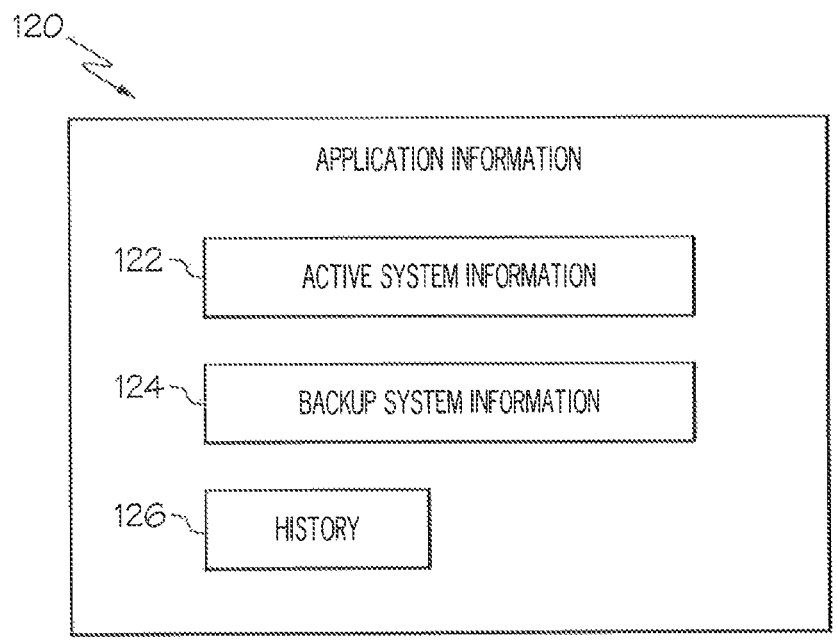
FIG. 2 illustrates example details of the transfer module of FIG. 1, according to certain embodiments of the present disclosure.

Referring now to FIG. 2, example application information 120 includes active system information 122, backup system information 124, and history 126. Various embodiments may include some, all, or none of these components. Transfer module 100 may obtain this information via different types of graphical user interfaces ("GUIs"), web applications, or any other suitable means for obtaining information.

Active system information 122 includes information associated with one or more "active" computer systems running an application. "Active" systems maintain information associated with the application, but may or may not be actively executing the application at any particular time. Furthermore, multiple "active" computer systems may be running the application concurrently, each maintaining different application states.

Active system information 122 may include information about one or more computer systems running the application. This information may include computer system identifiers, server names, location information, resource utilization information, resource availability information, network information (such as, for example, IP addresses, bandwidth information), hardware information (such as processor or memory information), software information, security information (such as encoding information, encryption information, or authorization information), or any other information associated with one or more computer systems. Active system information 122 may also include information indicating relationships between one or more computer systems (such as, for example, multiple servers running the application concurrently, failover servers associated with particular active servers, or any other relationship information). Active system information 122 may also include information associated with one or more applications running and/or stored on the computer system. For example, active system information 122 may include information indicating when the application was most recently backed up or information identifying one or more portions of the application state that have changed since the most recent back-up. In some embodiments, active system information may also include one or more portions of the application state itself. Active system information 122 may include any of the information or types of information described above in reference to active system information 28.

Transfer module 100 may utilize active information 122 to select the ideal first transfer computer system, which may or may not be an active computer system. Transfer module 100 may also utilize active information 122 to determine a delta state associated with two different computer systems, and to manage the communication of application state to computer system 30 during the transfer.

Backup system information 124 includes information associated with one or more "backup" computer systems running an application. Backup computer systems may or may not be running, or capable of running, the application. In some embodiments, backup computer systems may be failover computer systems. Backup system information 124 may include any of the types of information discussed above in reference to back system information 29. Transfer module 100 may utilize backup information 124 to select the ideal first transfer computer system, which may or may not be a backup computer system. Transfer module 100 may also utilize backup information 124 to determine a delta state associated with two different computer systems, and to manage the communication of application state to computer system 30 during the transfer.

History 126 includes information associated with previous states or transactions associated with one or more applications. For example, history 126 may include information indicating when the application was most recently backed up or information identifying one or more portions of the application state that have changed since the most recent back-up. History 126 may also include information associated with previous application transfers. For example, history 126 may include information identifying one or more computer systems 30 that have previously run the application as well information indicating whether such computer systems maintain baseline information, backup information, or any other state associated with the application. This type of information may allow transfer module 100 to provide more efficient application transfers by reducing the amount of data that must be transferred to computer system 30 in situations where computer system 30 already has access to one or more portions of the application. History 126 may also allow transfer module 100 to identify target computer systems that satisfy a policy associated with the application or otherwise improve the initial selection of computer system 30 from among multiple computer systems.

Figure 3:
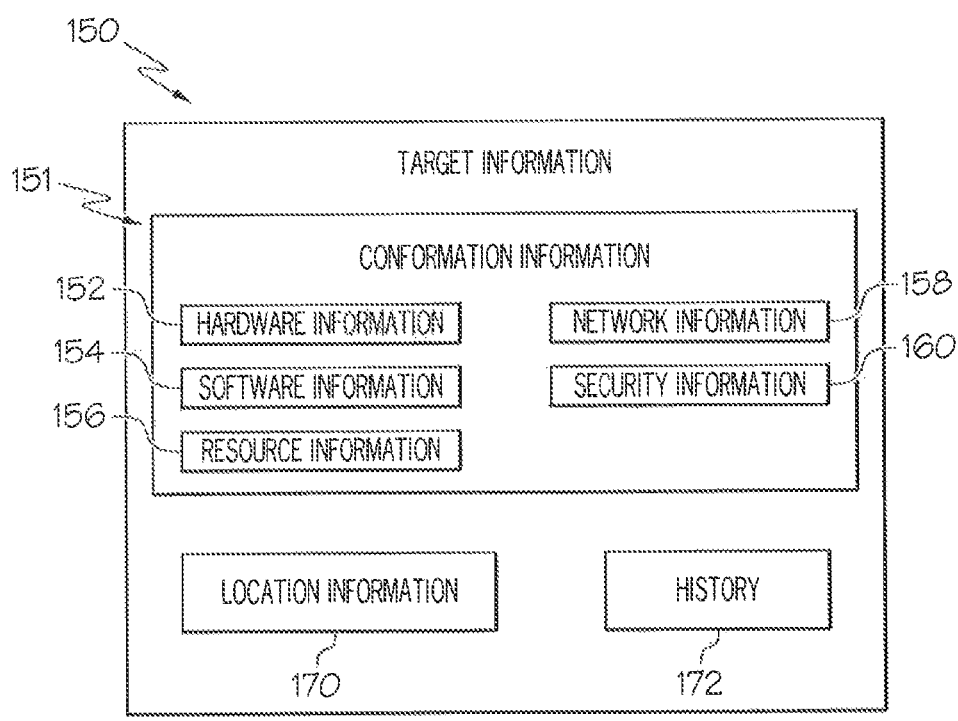
FIG. 3 illustrates example details of the transfer module of FIG. 1, according to certain embodiments of the present disclosure.

Referring now to FIG. 3, example target information 150 includes configuration information 151, location information 170, and history 172. Various embodiments may include some, all, or none of these components.

Configuration information 151 includes information associated with the configuration of one or more target computer systems. This information may be used by transfer module 100 to select a target computer system, determine whether a target computer satisfies a policy associated with an application, select a first transfer computer system from which application state will be transferred, or otherwise facilitate transferring execution of an application. In the illustrated embodiment, configuration information includes hardware information 152, software information 154, resource information 156, network information 158, and security information 160.

Hardware information 152 includes any suitable information associated with one or more hardware components of a target computer system, such as computer system 30. Hardware information 152 may include information related to processors, networking hardware, memories, cases, fans, busses, cards, external hardware, I/O hardware, or any other information associated with computer hardware. Transfer module 100 may utilize hardware information 152 to select a first transfer computer system. Transfer module 100 may also utilize hardware information 152 to select a target computer system or determine whether a target computer system satisfies one or more hardware-related policies. For example, a policy may specify that a target computer system being considered to receive a transfer of a particular application should include a specific type and/or number of processors or that a target computer system should meet certain minimum memory specifications.

Software information 154 includes any suitable information associated with one or more software components of a target computer system, such as computer system 30. Software information 154 may include information related to operating systems, firmware, applications, security software, drivers, software versions, or any other information associated with computer software. Software information 154 may also include information indicating a relationship between such components. Transfer module 100 may utilize software information 154 to select a first transfer computer system. Transfer module 100 may also utilize software information 154 to select a target computer system or determine whether a target computer system satisfies one or more software-related policies. For example, a policy may specify that a target computer system being considered to receive a transfer of a particular application should run a certain type of operating system.

Resource information 156 includes any suitable information associated with the usage and/or availability of one or more resources associated with a target computer system, such as computer system 30. Resource information 156 may indicate past, present, or future usage and/or availability. Resource information 156 may include information about actual usage and/or availability as well as likely or prospective usage and/or availability. Resource information 156 may include information related to hardware, software, network, or any other type of resource associated with a computer system. Transfer module 100 may utilize resource information 156 to select a first transfer computer system. Transfer module 100 may also utilize resource information 156 to select a target computer system or determine whether a target computer system satisfies one or more resource-related policies. For example, a policy may specify that a target computer system being considered to receive a transfer of a particular application should have certain processing resources available.

Network information 158 includes any suitable information associated with one or more networks associated with a target computer system, such as computer system 30. Network information 158 may include information related to networking hardware, networking software, network topology, network location, network usage or availability, bandwidth, addressing information, or any other network information. Transfer module 100 may utilize network information 158 to select a first transfer computer system. Transfer module 100 may also utilize network information 158 to select a target computer system or determine whether a target computer system satisfies one or more network-related policies. For example, a policy may specify that a target computer system being considered to receive a transfer of a particular application should contain specific types of networking hardware.

Security information 160 includes any suitable information associated with the security of a target computer system, such as computer system 30. Security information 160 may include information related to physical security (such as, for example, measures restricting physical access to a server), hardware security, software security, security certifications, or any other security information. Transfer module 100 may utilize security information 160 to select a first transfer computer system. Transfer module 100 may also utilize security information 160 to select a target computer system or determine whether a target computer system satisfies one or more security-related policies. For example, a policy may specify that a target computer system being considered to receive a transfer of a particular application should implement specific physical security measures.

Location information 170 includes any suitable information associated with the location of a target computer system, such as computer system 30. Location information 170 may include geographic location information (such as, for example, coordinates, addresses, or other geographic location information), network location information (such as, for example, URLs, IP addresses, or other information associated with a computer system's network location), or any other location-related information. Location information 170 may also include data transfer rate information associated with a computer system. For example, using the IP addresses of a target computer along with the IP addresses of one or more computer systems 20, transfer module 100 may determine traceroute information, ping information, latency information, or any other information indicating data transfer rates between the target computer system and the respective computer systems 20.

Transfer module 100 may utilize location information 170 to select a first transfer computer system. For example, transfer module 100 may use this information to determine that data transfer would likely be fastest from a backup computer system (such as computer system 20b), in which case this backup computer system may be selected as the first transfer computer system. Transfer module 100 may also utilize location information 170 to select a target computer system or determine whether a target computer system satisfies one or more network-related policies. For example, a policy may specify that a target computer system being considered to receive a transfer of a particular application should not be located in a particular country or operated by particular organizations.

History 172 includes information associated with previous states or transactions associated with a target computer system. For example, history 172 may include information indicating whether an application was previously executed by the target computer system. As another example, history 172 may include information indicating whether any baseline of application state is stored by the target computer system. This type of information may allow transfer module 100 to provide more efficient application transfers by reducing the amount of data that must be communicated to computer system 30. History 172 may also include information about the previous execution of the application. For example, history 172 may include information related to costs, execution errors, or other performance issues. History 126 may allow transfer module 100 to more quickly identify target computer systems that satisfy a policy associated with the application or otherwise improve the initial selection of computer system 30 from among multiple computer systems.

Figure 4:
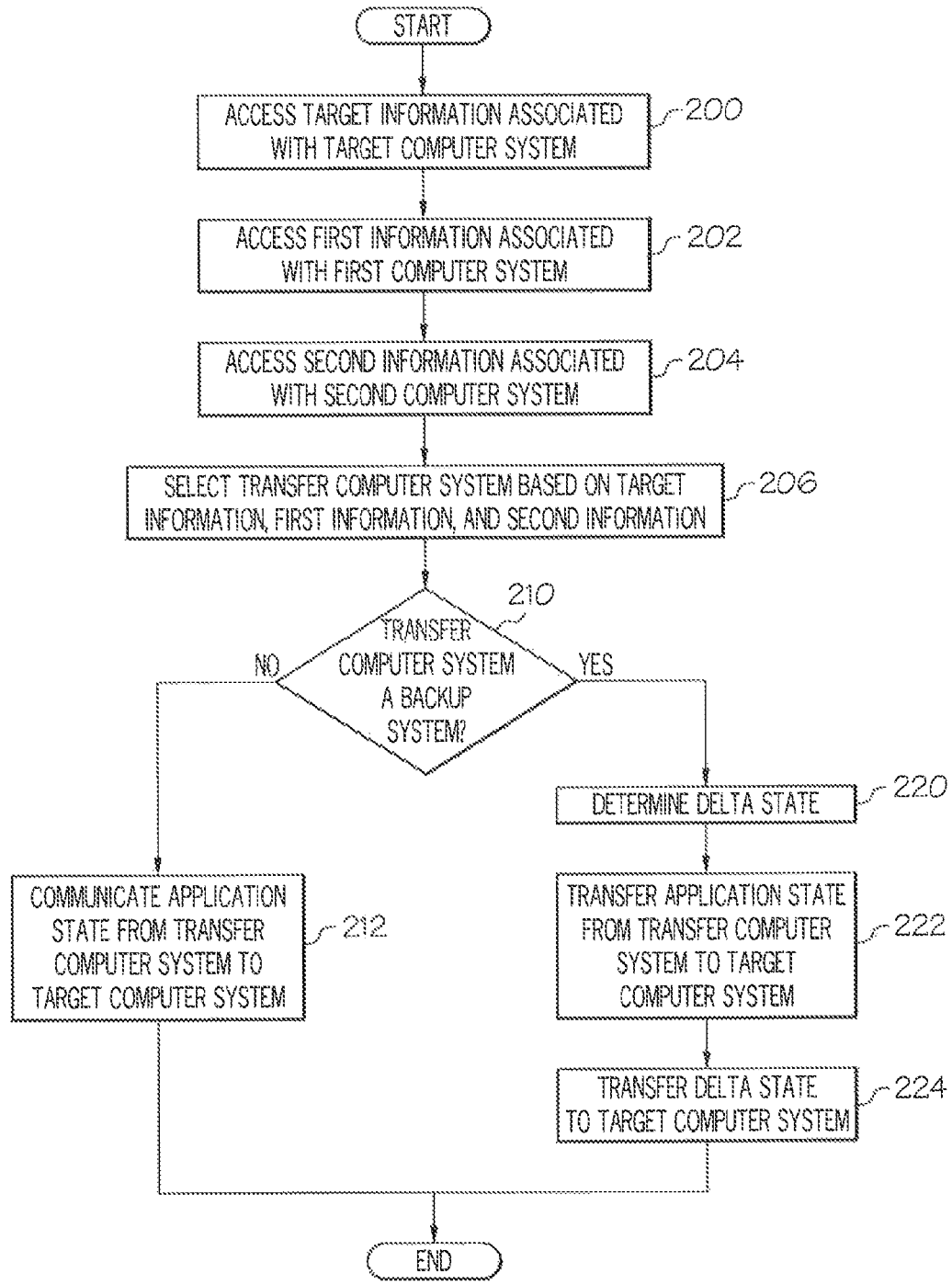
FIG. 4 illustrates an example sequence for facilitating the transfer of an application, according to certain embodiments of the present disclosure.

Referring now to FIG. 4, an example transfer sequence is shown that facilitates transferring execution of an application.

At step 200, transfer module 100 accesses target information associated with a target computer system. The target computer system may be any candidate computer system for executing an application. The accessed information may include the types of information discussed above in reference to target information 150.

At step 202, transfer module 100 accesses first information associated with a first computer system. The first computer system may be an active system, such as computer system 20a. The accessed information may include the types of information discussed above in reference to active system information 122 or any other type of information associated with a computer system that executes the application or maintains state associated with the application. The first computer system may be a computer system that is actively executing the application, or it may be a computer system that is not actively executing the application and is storing application state associated with the application.

At step 204, transfer module 100 accesses information associated with a second computer system. The second computer system may be a backup system, such as computer system 20b. The accessed information may include the types of information discussed above in reference to active system information 122 or any other type of information associated with a computer system that executes the application or maintains state associated with the application. The second computer system may be a computer system that is operating as a backup system or a failover system for the application. The second computer system may be a computer system that is actively executing the application, or it may be a computer system that is not actively executing the application and is storing application state associated with the application.

At step 206, transfer module 100 selects a transfer computer system based at least on the target information, first information, and second information. The transfer computer system is the computer system which will transfer "baseline" application state to the target computer system. In situations where the first target computer system is actively executing the application, this baseline may be up-to-date. In situations where the first target system is a backup computer system that lacks certain up-to-date application state relative to an active computer system, additional "delta" state may be transferred as well.

Various embodiments may utilize different logic for selecting the first transfer computer system from the first and second computer systems. For example, transfer module 100 may analyze information indicating the respective locations of the computer systems to select the computer system 20 that is geographically closest to computer system 30. In other embodiments, transfer module 100 may utilize information associated with the computer systems (such as, for example, IP addresses), to determine respective data transfer rates between computer systems 20 and computer system 30. This information may include traceroute information, bandwidth information, ping information, or any other suitable information. In a particular example, this information the information accessed during steps 200, 202, and 204 may include IP addresses, and transfer module 100 may use these IP addresses to determine data transfer rates between the respective computer systems and the target computer. Based on this data transfer rate information, transfer module 100 may select the computer having the fastest data transfer rate as the transfer computer system. In some embodiments, transfer module 100 may consider factors in place of or in addition to the location information and data transfer rate information described above. Other factors may include cost, resource usage and/or availability, or any other suitable factor. Parameters affecting this selection may be stored as part of a policy associated with the application or they may be stored in any other suitable format. Furthermore, any such parameters may be stored by transfer module 100, the first computer system, the second computer system, the target computer system, or any other suitable computer system. Furthermore, users may be able to set preferences for various factors that affect the selection of the first transfer computer system or otherwise affect how information is communicated to the target system.

At step 210, transfer module 100 determines whether the computer system that was selected as the transfer computer system is a backup computer system, which may indicate whether the state stored by that system is up-to-date. For example, where the first transfer computer system is a backup computer system, one or more computer systems that are actively executing the application may contain application state that is not stored by the backup computer system. In the present example, if the transfer computer system is not a backup system, transfer module 100 proceeds to step 212, and if the transfer computer system is a backup system, transfer module 100 proceeds to step 220. Other embodiments may involve multiple active computer systems, each of which includes application state that the other does not. In such embodiments, transfer module 100 may not rely on its determination of whether or not the transfer computer system is a backup system to determine whether or not to initiate determination of a delta state.

At step 212, transfer module 100 facilitates the transfer of application state stored by the transfer computer system to the target computer system. The first transfer computer system transfers one or more portions of the application state to the target computer system in order to facilitate the transfer of execution of the application to the target computer system. It is assumed, for the purposes of this example, that the transfer computer system contains is an active computer system containing application state that is completely up-to-date. Following the transfer of application state from the transfer computer system (i.e. an active computer system), additional steps may be performed to complete the transfer of execution of the application to the target computer system.

At step 220, transfer module 100 facilitates the determination of a delta state associated with the application. The delta state includes information associated with a difference between the application state stored by first and second computer systems. For example, the second computer system may be a failover system for the first computer system, and the second computer system may have its application state periodically updated with information from the first computer system. Thus, delta state may include application state stored by the first computer system that has updated since the most recent synchronization of application state on the second computer system.

The determination of delta state may be made in a variety of ways. For example, transfer module 100 could initiate a determination that utilizes timestamp information associated with application state stored on one or more computers. This timestamp information may indicate whether computer systems other than the transfer computer system contain information that is not captured by the target computer system's baseline. As another example, transfer module 100 may compare application state stored by the first and second computer systems in order to determine whether the application state stored by the transfer computer system is up-to-date. For example, an active computer system may store information identifying the portions of the application state that have been updated since the application state was most recently synchronized with a backup computer system. Analyzing this information may allow transfer module 100 to determine whether the computer system that was not selected as the transfer computer system contains application state that is different from the state stored by the first transfer computer system. As another example, an active computer system may flag portions of the application state that have been updated since the application state was most recently synchronized with a backup computer system. In such embodiments, transfer module may initiate determination of a delta state by causing computer system 20a to transfer only these flagged portions of its application state. Any portions of the analysis described above may be performed by transfer module 100, the first computer system, the second computer system, or any other suitable computer system.

At step 222, transfer module 100 initiates the transfer of application state stored by the transfer computer system to the target computer system. The transfer computer system communicates one or more portions of the application state to the target computer system in order to facilitate the transfer of execution of the application to the target computer system. Since, as explained above, this transfer computer system may not contain one or more portions of the application state that is stored by an active computer system, the target computer system may require additional application state (for example, the delta state) from the other computer system before transferring execution of the application is complete. While the target computer may be able to execute the application without this delta state, the application may not be in the most up-to-date state without receiving the delta state. In certain embodiments, the application state may be transferred to the target computer system by computer system 20b. In other embodiments, the delta state may be transferred to the target computer system by transfer module 100.

At step 224, transfer module 100 initiates the transfer of the delta state to the target computer system. The computer system that was not selected as the first transfer computer system communicates the delta state to the target computer system. Upon receiving this delta state, the target computer system may have received sufficient information to begin executing the application in an up-to-date state. In certain embodiments, the delta state may be transferred to the target computer system by computer system 20a. In other embodiments, the delta state may be transferred to the target computer system by transfer module 100.

The communication of information described in reference to steps 222 and 224 may occur between different types of computer system that may be owned and/or operated by different entities. For example, the first transfer computer system may be operated by a first vendor (such as a cloud-computing vendor), while the target computer system is operated by a second vendor. As another example, the first transfer computer system and the target computer system may be operated by the same vendor. As yet another example, the first transfer computer system may be operated by a customer of a first vendor, while the target computer system is operated by the first vendor. Furthermore, the various computer systems may be located in different geographic regions. For example, the first computer system may be located in a first geographic location, and the second computer system may be located in a second geographic location remote from the first geographic location. In various embodiments, the computer systems described herein may be operated as part of a datacenter. Furthermore, the various computer systems may be located in the same datacenter or in separate datacenters.

In certain embodiments, the transfer of the application described in the above steps is transparent to the user. For example, a customer of a cloud-computing vendor may implement one or more policies indicating how and/or under what circumstances an application should be moved from one computer system to another. In such circumstances, transfer module 100 may facilitate the transfer of the application dynamically based on the policy.

After applications are "recreated" on the target computer system, as described in the transfer sequence above, one or more "snapshots" of the application state may be stored on the first computer system, second computer system, target computer system, or any other computer system. Furthermore, in situations where the target computer system is operated by a vendor (rather than, for example, a user of the application or a customer of the vendor), such snapshots may be communicated to and/or stored by one or more computer systems owned or operated by the customer of the vendor.

Various embodiments may perform some, all, or none of the steps described above. Furthermore, certain embodiments may perform these steps in different orders or in parallel, and certain embodiments may also perform additional steps. While discussed as transfer module 100 performing these steps, any suitable component of system 5 may perform one or more steps of the method. For example, the functionality described in reference to transfer module 100 may be incorporated into computer system 20a and/or computer system 20b. This functionality may also include any number of additional computer systems. For example, some embodiments may include additional computer systems actively executing the application or operating as backup computer systems, and transfer module may incorporate information associated with their respective application states into the analysis described above.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims. For example, in various embodiments, transfer module 100 may have different types, numbers, and configurations of interface 102, processor 104, memory 110, or any components thereof. As another example, various embodiments may include some, all, or none of the components of application information 120 shown in FIG. 2 or the target information shown in FIG. 3. As another example, certain embodiments may include additional logic to facilitate the receiving and processing of information, the presentation of one or more GUIs, or post-communication analysis.

What is claimed is:

1. A method comprising: accessing, by a processor, target information associated with a target computer system, the target computer system being a candidate computer system for transferring execution of an application; accessing, by the processor, first information associated with a first computer system, the first computer system storing a first state of the application; accessing, by the processor, second information associated with a second computer system, the second computer system storing a second state of the application; selecting, by the processor, a transfer computer system from which to transfer the state of the application to facilitate transfer of execution of the application, the transfer computer system comprising the second computer system and selected based at least on the first information, the second information, and the target information; initiating determination of a delta state comprising a portion of the first state that is different from the second state; initiating transfer of the second state to the target computer system; and initiating transfer of the delta state to the target computer system.

2. The method of claim 1, further comprising: transferring, by the second computer system, the second state to the target computer system; and transferring, by the first computer system, the delta state to the target computer system.

3. The method of claim 1, wherein: the target information comprises information indicating a geographic location of the target computer system; the first information comprises information indicating a geographic location of the first computer system; and the second information comprises information indicating a geographic location of the second computer system.

4. The method of claim 1, wherein selecting the transfer computer system comprises: determining first transfer information associated with a data transfer rate between the first computer system and the target computer system; determining second transfer information associated with a data transfer rate between the second computer system and the target computer system;
and selecting the transfer computer system based on the first transfer information and the second transfer information.

5. The method of claim 1, wherein: the transfer computer system is operated by a first vendor; and the target computer system is operated by a second vendor.

6. The method of claim 1, wherein: the transfer computer system is operated by a customer of a first vendor; and the target computer system is operated by the first vendor.

7. The method of claim 1, wherein: the first computer system is located in a first geographic location; and the second computer system is located in a second geographic location remote from the first geographic location.

8. The method of claim 1, wherein: the first computer system actively executes the application; and the second computer system is a backup computer system for the application.

9. A system comprising: a network interface; a memory unit; and a processor configured to: access target information associated with a target computer system, the target computer system being a candidate computer system for transferring execution of an application; access first information associated with a first computer system, the first computer system storing a first state of the application; access second information associated with a second computer system, the second computer system storing a second state of the application; select a transfer computer system from which to transfer the state of the application to facilitate transfer of execution of the application, the transfer computer system comprising the second computer system and selected based at least on the first information, the second information, and the target information; initiate determination of a delta state comprising a portion of the first state that is different from the second state; initiate transfer of the second state to the target computer system; and initiate transfer of the delta state to the target computer system.

10. The system of claim 9, further comprising: the first computer system, the first computer system configured to transfer the delta state to the target computer system; and the second computer system, the second computer system configured to transfer the second state to the target computer system.

11. The system of claim 9, wherein: the target information comprises information indicating a geographic location of the target computer system; the first information comprises information indicating a geographic location of the first computer system; and the second information comprises information indicating a geographic location of the second computer system.

12. The system of claim 9, wherein selecting the transfer computer system from the first computer system and the second computer system comprises: determining first transfer information indicating a data transfer rate between the first computer system and the target computer system; determining second transfer information indicating a data transfer rate between the first computer system and the target computer system; and selecting the transfer computer system based on the first transfer information and the second transfer information.

13. The system of claim 9, wherein: the transfer computer system is operated by a first vendor; and the target computer system is operated by a second vendor.

14. The system of claim 9, wherein: the transfer computer system is operated by a customer of a first vendor; and the target computer system is operated by the first vendor.

15. The system of claim 9, wherein: the first computer system is located in a first geographic location; and the second computer system is located in a second geographic location remote from the first geographic location.

16. The system of claim 9, wherein: the first computer system actively executes the application; and the second computer system is a backup computer system for the application.

17. A computer program product comprising: a non-transitory computer readable storage medium having computer readable program code embodied therewith, the computer readable program code comprising: computer readable program code configured to access target information associated with a target computer system, the target computer system being a candidate computer system for transferring execution of an application; computer readable program code configured to access first information associated with a first computer system, the first computer system storing a first state of the application; computer readable program code configured to access second information associated with a second computer system, the second computer system storing a second state of the application; computer readable program code configured to select a transfer computer system from which to transfer the state of the application to facilitate transfer of execution of the application, the transfer computer system comprising the second computer system based at least on the first information, the second information, and the target information; computer readable program code configured to initiate determination of a delta state comprising a portion of the first state that is different from the second state; computer readable program code configured to initiate transfer of the second state to the target computer system; and computer readable program code configured to initiate transfer of the delta state to the target computer system.

* * * * *